(Model.)

L. C. HILL.
FRUIT STONER.

No. 272,549. Patented Feb. 20, 1883.

Witnesses.
F. M. Gabbert
Martin Purkeypile

Louis C Hill Inventor.

UNITED STATES PATENT OFFICE.

LOUIS C. HILL, OF MYRTLE CREEK, OREGON.

FRUIT-STONER.

SPECIFICATION forming part of Letters Patent No. 272,549, dated February 20, 1883.

Application filed April 27, 1882. (Model.)

*To all whom it may concern:*

Be it known that I, LOUIS C. HILL, a citizen of the United States, residing at Myrtle Creek, Douglas county, Oregon, have invented certain Improvements in Shellers and Seeders, of which the following is a specification.

The invention consists in certain improvements in the construction of devices for removing the seeds from cherries, peaches, and other like fruits, as will be hereinafter described, and pointed out in the claim.

Figure 1:
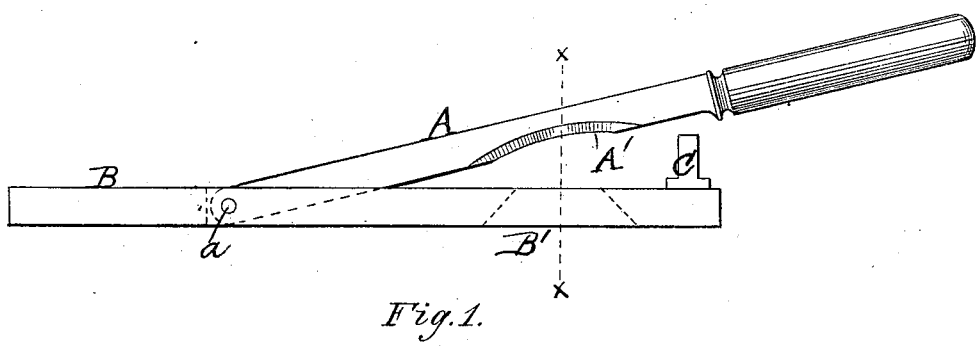
Figure 2:
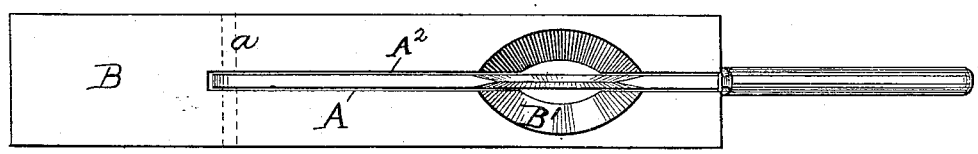
Figure 3:
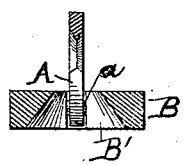
Figure 4:
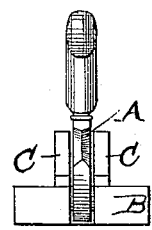

In the drawings, Figure 1 represents a side elevation; Fig. 2, a bottom plan view; Fig. 3, a vertical section on the line $x\ x$ of Fig. 1, and Fig. 4 an end elevation of my improved device.

B represents the base, which may be of wood or any other suitable material, and of any desired shape or size.

$A^2$ represents a slot formed longitudinally of the base, and extending from the front end rearwardly about two-thirds of the length of said base.

A represents a knife, which is pivoted at its rear end by a rivet or pivot, $a$, within the rear end of the slot $A^2$, said rivet or pivot forming the fulcrum upon which the knife is operated. This knife extends from said fulcrum to the front end of the base, where it is provided with a suitable handle.

In the under face of the knife is formed a concave-shaped recess or niche, A', and in the base B is formed, in suitable position to be opposite to the niche A' in the knife when said knife is in operative position, a conical-shaped opening or slot, B'. This conical shape is of advantage, as it permits of the seed being readily expelled therethrough, and entirely prevents the seed clogging therein. At the upper forward end of the base are ways or guides C, which serve as guides for the knife during its operative movement.

The operation of the device is as follows: The knife is first raised upward from its normal horizontal position. The fruit to be pitted is then placed within the upper portion or smaller end of the conical-shaped opening B' of the base B. The knife is then pressed down upon the fruit with the concavity A' in its under face resting directly upon the fruit. Then by a continued downward pressure of the handle upon the fruit the knife will sever the fruit into two portions and expel the pit or seed therefrom and down through the conical opening B'.

This seeding device may be readily secured to a table or other structure by simply securing the base thereto in any well-known manner, a hole being made in such table or other article through which the seeds may fall, or the base may be so secured that the conical opening projects beyond the edge of the table or other support in order that the seeds may be dropped into a suitable receptacle at the edge of such table without necessitating any preparation of such table for use with this device.

I am aware that fruit-pitting machines have been constructed with a base or table having one or more perforations therein, and a punch or punches operated either by hand, lever, or foot power, so that on the descent of such punches the seed shall be expelled from the fruit.

What I claim as my invention is—

The fruit-pitter herein described, consisting of base B, having longitudinal slot $A^2$, conical opening or slot B', and knife-guides or ways C, and the knife A, having concave or niche A', and pivoted at $a$ within the longitudinal slot $A^2$, substantially as and for the purpose set forth.

LOUIS C. HILL.

Witnesses:
J. M. HEARD,
KEELER H. GABBERT.